T. DITMARS.
WHEEL DRIVE.
APPLICATION FILED JAN. 12, 1921.
1,402,580.
Patented Jan. 3, 1922.
2 SHEETS—SHEET 1.
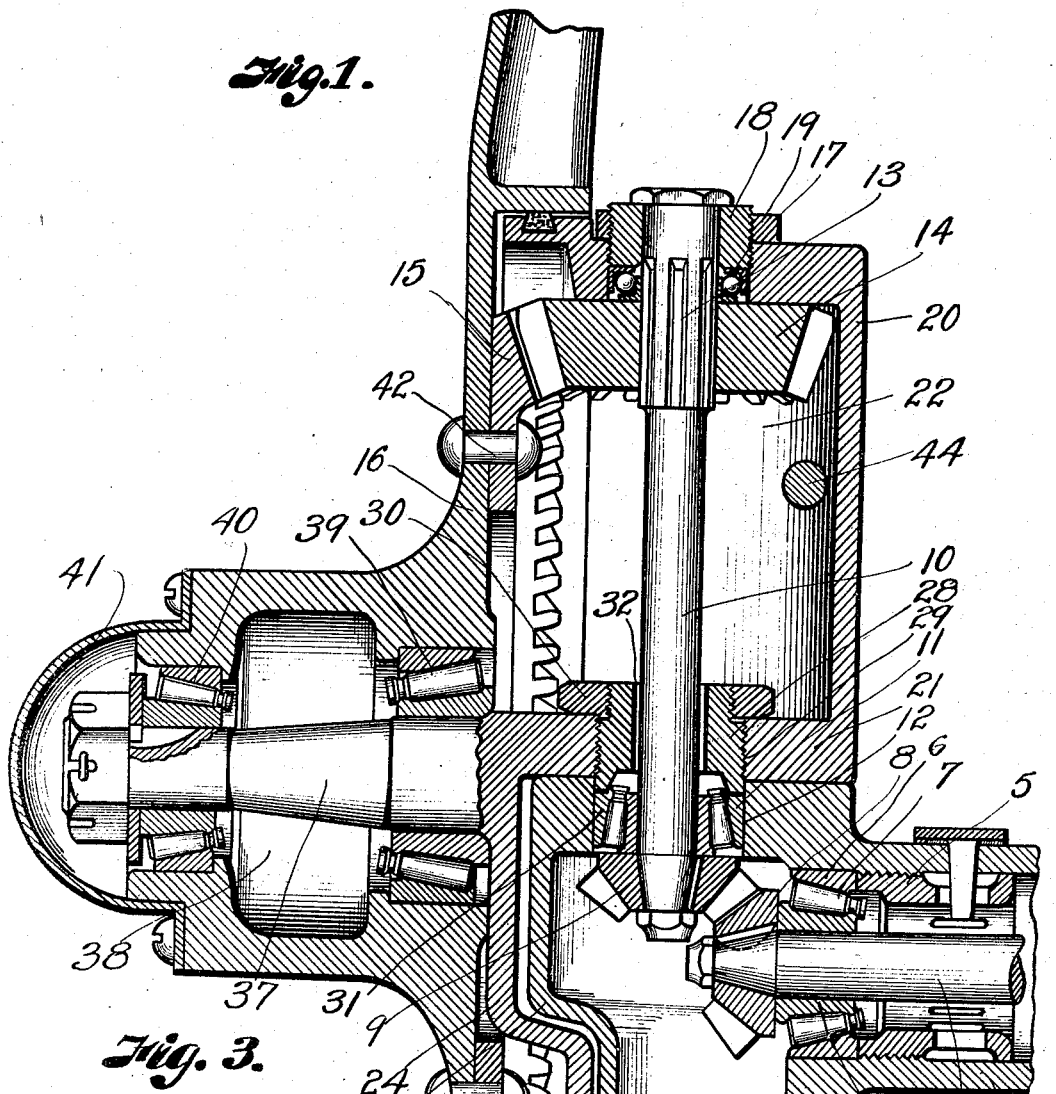
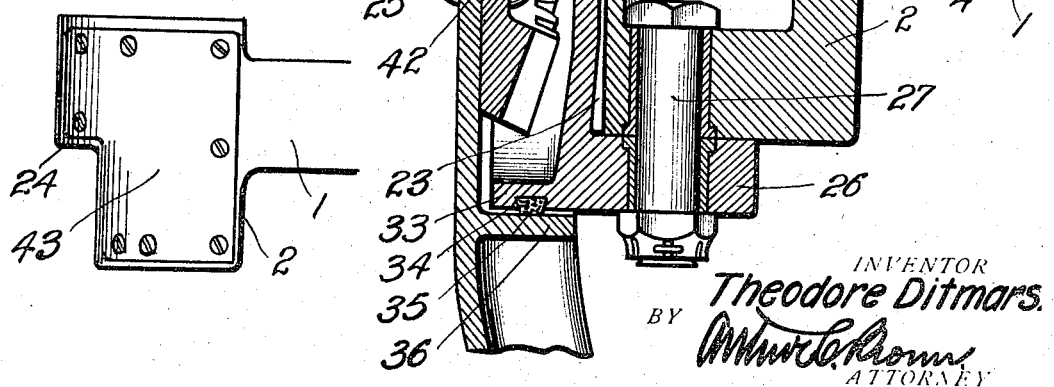
INVENTOR
Theodore Ditmars.
BY
ATTORNEY

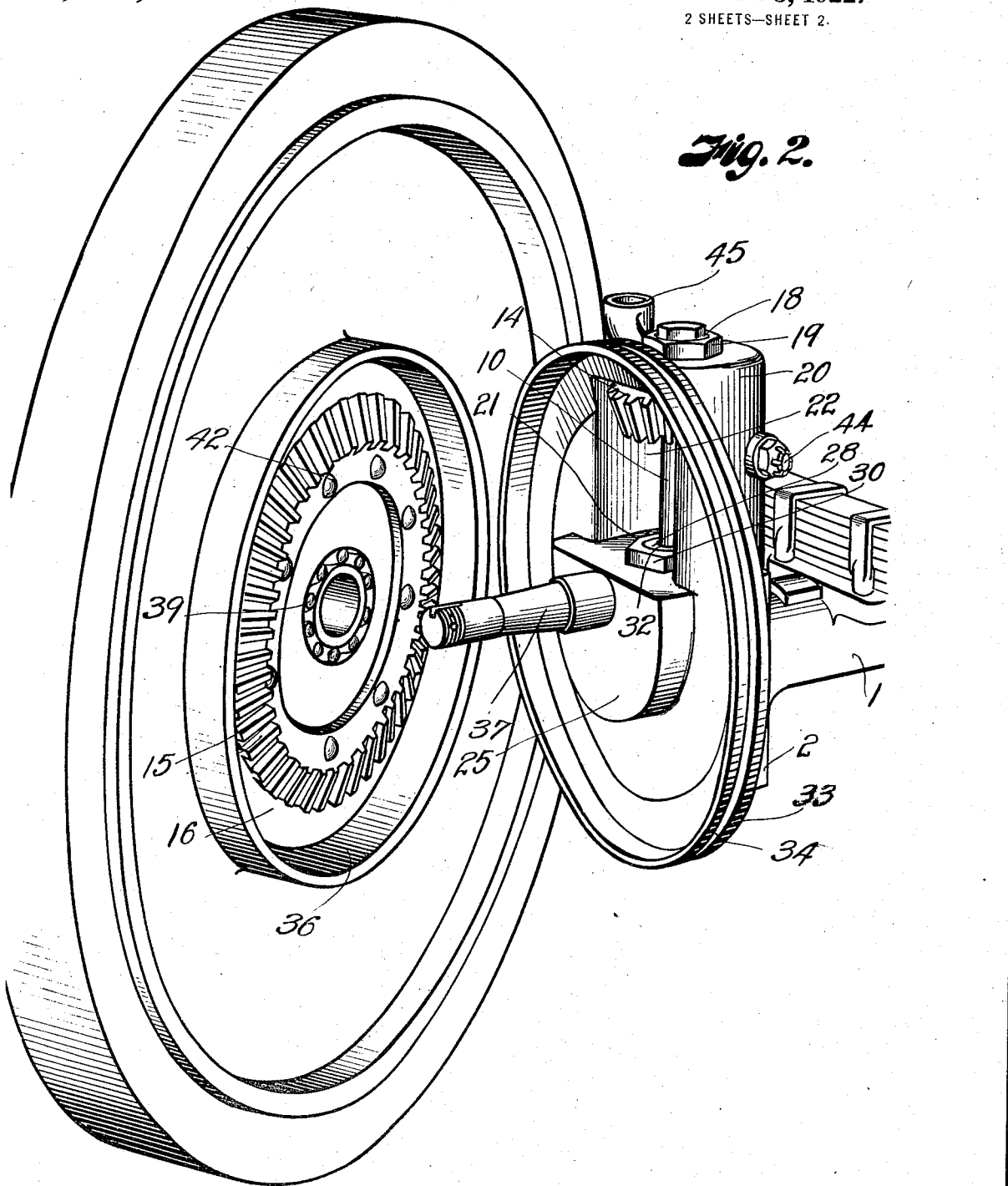

UNITED STATES PATENT OFFICE.

THEODORE DITMARS, OF KANSAS CITY, MISSOURI.

WHEEL DRIVE.

1,402,580. Specification of Letters Patent. Patented Jan. 3, 1922.

Application filed January 12, 1921. Serial No. 436,787.

*To all whom it may concern:*

Be it known that I, THEODORE DITMARS, a citizen of the United States, residing at Kansas City, in the county of Jackson and State of Missouri, have invented certain new and useful Improvements in Wheel Drives; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a wheel drive mechanism for motor vehicles and it particularly contemplates the provision of means for effecting ease of operation of the driving parts between the axle and the wheel hub.

One of the purposes of my invention is to provide means whereby the load of the car or truck will not be communicated to the gearing transmitting the power from the drive shaft to the hub. I am, therefore, able to provide a floating power transmitting shaft in the spindle block, which may be adjusted to provide for wear of the gears and which will be conveniently carried in bearings, the only strain on the shaft being the torque generated by transmitting the power from the drive shaft to the ring gear connected to the hub.

The invention contemplates certain novel details of construction and combinations of parts, all of which will be referred to hereinafter, reference being had to the accompanying drawings, in which—

Fig. 1 is a vertical, longitudinal, sectional view through the axle block, the spindle block and the co-operating parts.

Fig. 2 is a perspective view of the end of the spindle block, the spindle and a wheel to be secured thereto, and Fig. 3 is a reduced elevational view of one side of the axle block or head, showing a removable plate attached thereto.

Referring now to the numerals of reference:

1 designates an axle, on the respective ends of which are heads. I have shown only one end of the axle, the opposite end being a duplicate of the one shown. Each head consists of a hollow block 2, communicating with the interior of the axle 1, in which are bearings 3 to support the drive axle 4, there being an adjustable bushing 5 for adjusting the bearing or raceway 3, as will be well understood. Between the raceway 3 and the bearing collar 6 are anti-friction devices, shown as cone rollers 7.

On the end of the axle 4 is shown a beveled gear 8, meshing with a beveled gear 9 on a floating shaft 10 in an adjustable bearing 11 within the opening 12 on the top of the block 2. The shaft 10 has a splined collar 13 at its upper end, on which is a beveled gear 14, adapted to mesh with a ring gear 15 on the hub 16 of the wheel. The upper extremity of the shaft 10 is mounted in bearings 17, which may be tightened through the medium of a threaded bushing 18, provided with a jam nut 19, as will be clearly seen by reference to Fig. 1.

The bearings 17 are in a spindle block 20, consisting of an intermediate horizontal web 21, a rectangular gear recess or chamber 22, open at its front end, and an axle block or head-receiving lower chamber 23, depending from the web 21 and opening at its inner end to receive the head 2, the recess portion 23 having an offset 24 to receive the offset portion 25 of the axle block or head 2.

The bottom of the block 2 rests upon the flange 26, constituting the floor of the chamber 23, and there is a pivot bolt 27, extending through the bottom of the wall block 2 and through the flange 26, as will be seen by reference to Fig. 1, so that the spindle block or head may be pivoted to the axle block or head.

The bolt 10 projects through an adjustable bushing 28 in the threaded recess 29 in the web 21, which constitutes the floor of the recess 22 and extends into the recess 12, constituting a pivot at that point for the spindle block.

The adjustable bushing 28 is provided with a jam nut 30 to hold it in adjusted position when it has moved the loose raceway 31 of the bearing 11 longitudinally, the center of the bushing being provided with a longitudinal opening 32 of greater diameter than the diameter of the bolt 10.

The block 20 is provided with a circumferential flange or ring 33 having a groove 34 to receive a packing 35 to bear against the circumferential telescoping flange 36 on the hub 16 so that when the packing 35 bears against the inner face of the ring flange 36, the mechanism within the block 20 will be protected against dust, dirt and other foreign substances.

The spindle 37, integral with the block 20 and aligning in part at least with the web 21, projecting outwardly into the recessed portion 38 of the hub 16, carries bearings 39 and 40 of appropriate construction to enable the hub to rotate about the spindle, there being a hub cap 41 attached to the hub to provide against dirt entering the hub at that point.

The ring gear 15 is rigid with the hub of the wheel, being fastened thereto by rivets 42. Access can be had to the interior hub block or head 2 by removing the cover plate 43, there being one or more cover plates for this purpose.

If desired, an arm 44 may extend through the recessed portion 22 of the block 20 and have on its end 45 a socket to receive a steering arm whereby the spindle block may be turned about its pivot, consisting of the pivot bolt 27 and the bushing 28.

By reference to Fig. 1, it will be observed that the block 2 rests upon the flange 26 so that the entire weight of the car is supported on the flange 26, leaving the reduction gearing provided by the gears 8, 9, 14 and 15 devoid of any pressure other than tooth pressure generated by transmitting the power from the axle 4 to the ring gear 15. This is an important feature of my invention since in known devices where the weight is absorbed by the gear teeth, an excessive amount of friction results, which is detrimental to the proper operation of the gearing.

It will be apparent from the foregoing that a device constructed in accordance with my invention will be simple in operation, that it may be conveniently constructed and assembled and that the liability of the load being transmitted to the operating gears will be entirely eliminated.

It will also be observed that there will be sufficient play of the shaft 10 in the bushing 28 to allow the shaft to maintain its position with respect to the gears even though there is a slight distortion or tilting between the axle block or head and the spindle block.

What I claim and desire to secure by Letters-Patent is:

1. In a wheel drive mechanism, an axle having a hollow head, a spindle block divided into upper and lower chambers opening in opposite directions, the lower chamber receiving the head of the axle, a drive shaft in the axle projecting into the hollow head, a gear on the shaft, a shaft loosely mounted in the spindle block and projecting through the upper end of the hollow axle head, a gear on the lower end of the second mentioned shaft meshing with the gear on the first mentioned shaft, a gear on the second mentioned shaft within the upper chamber of the spindle block, a spindle integral with a spindle block, a wheel hub mounted thereon, and a ring gear carried by the hub and meshing with the gear within the upper recess of the spindle block.

2. In a wheel drive, an axle head, a spindle block divided intermediate its ends by a web to form an upper and lower chamber, the lower chamber receiving the axle head pivoted thereto, a spindle integral with the web, a hub mounted on the spindle, and means for driving the hub about the spindle.

3. In a wheel drive, an axle having a head, a spindle block having an intermediate web dividing the block into an upper and lower compartment, the lower compartment receiving the axle head which rests upon the floor of the compartment of the spindle block, means for pivotally securing the spindle block and head together, a spindle integral with the web, a wheel mounted on the spindle, a ring gear carried by the hub of the wheel, a drive shaft in the axle, and means for communicating motion from the drive shaft to the ring gear on the wheel hub.

4. In a wheel drive, an axle having a head, a hollow spindle block divided into an upper and lower compartment, the lower compartment having a flange upon which the axle head is pivotally secured, a spindle integral with the spindle block, and a driving mechanism carried by the axle and spindle block.

5. In a wheel drive, an axle, a head on one end of the axle, a spindle block pivotally connected to the axle head, said spindle block comprising a hollow casing having oppositely opening recesses, one of which receives the head on the axle, gearing in the other recess, means for driving said gearing from the axle, and a spindle integral with the spindle block.

6. In a wheel drive an axle having a hollow head, a spindle block having an upper and a lower recess, said spindle block being pivotally connected to the axle head, and receiving the head in the lower recess, a spindle carried by the spindle block, a vertical shaft in the upper recess projecting through the floor thereof and extending into the hollow axle head, gearing in the axle head for driving said shaft, a gear mounted on the shaft in the upper recess for driving a wheel mounted on said spindle.

7. In a wheel drive, a spindle block comprising a hollow casing having a transversely disposed web dividing the hollow casing into upper and lower recesses, a spindle in line with the web, an axle head receivable in the lower recess and pivoted thereto, a circular flange on the forward edge of the spindle block, a wheel on the spindle having a flange over-lapping the flange on the spindle block, and means for driving the wheel from the axle.

8. In a wheel drive, an axle having a head, a spindle block having a lower recess receiving the head, said spindle block being pivoted to the head, and having an upper recess divided from the lower recess by a transverse web, a bushing in the web, a vertical shaft in the upper recess extending through the bushing, the diameter of the shaft being less than the inner diameter of the bushing, a bearing for said shaft in the wall of the upper recess, a bearing for said shaft in the wall of the head, said shaft extending through the head, means for driving said shaft from the axle, a gear in the upper recess mounted on the axle, a spindle carried by the spindle block, a wheel mounted on the spindle, and a gear carried by the wheel meshing with the gear in the upper recess of the spindle block.

9. A wheel drive for a motor vehicle comprising a hollow axle, a hollow head on the axle, a hollow spindle block divided intermediate its ends by a web to form upper and lower chamber, the lower chambers being of substantially the height of the block which snugly fits therein, an adjustable bushing in the web engaging the head, a pivot member connecting the lower end of the head and the block and mounted in bearings in the head and in one end of the block, a gear on the lower end of the shaft, a drive shaft in the axle having a gear meshing with the gear on the lower end of the vertical shaft, and a gear on the upper end of the vertical shaft within the upper recess of the block and having teeth to mesh with a gear on the wheel hub.

10. In a wheel drive, a spindle block comprising a hollow casing having a dividing web intermediate its ends to provide an upper chamber and a lower chamber, the ends of the chambers opening in opposite directions, a spindle integral with the web, and a circumferential flange on the block to telescope within a complementary flange on a wheel to be carried by the spindle whereby a dust-proof casing will be provided for the spindle.

11. In a wheel drive, an axle head, a spindle block having a web thereon, a bearing in the axle head for mounting a vertical shaft and a pivot member comprising a bushing adjustably mounted in the web and extending into the axle head to adjust said bearing.

12. In a wheel drive, an axle head, a spindle block having a web, a bearing in the axle head for mounting a vertical shaft, and a bushing adjustably mounted in the web of the spindle block and extending into the axle head for adjusting said bearing and pivotally mounting the spindle block to the axle head.

In testimony whereof I affix my signature.

THEODORE DITMARS.